(No Model.)  3 Sheets—Sheet 1.

J. W. ELLS.
MACHINE FOR MAKING COMPOUND WIRE.

No. 310,805.  Patented Jan. 13, 1885.

Witnesses:
H. D. Gamble
Jno. M. Macdonald

Inventor.
Josiah W. Ells

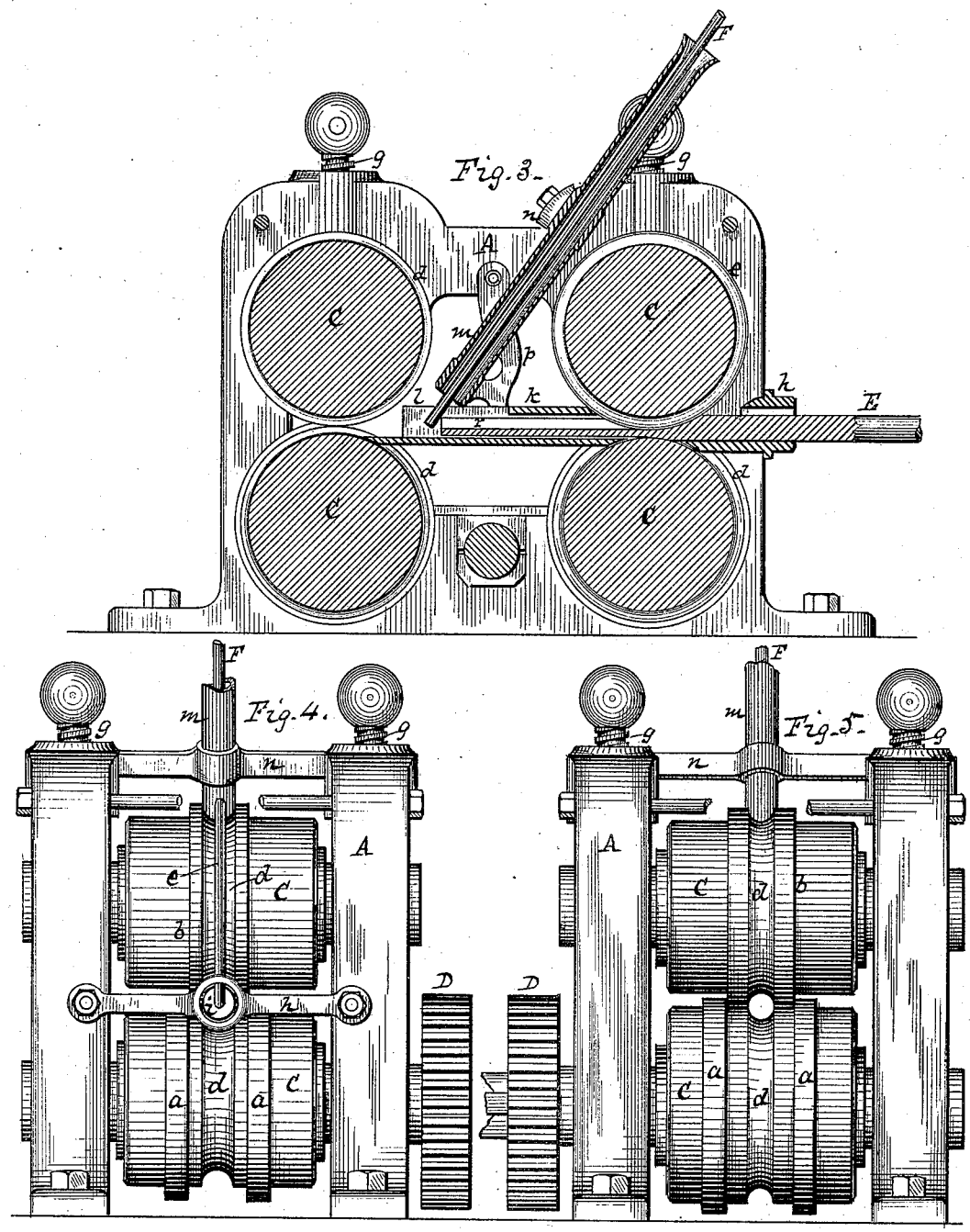

(No Model.)
3 Sheets—Sheet 3.
J. W. ELLS.
MACHINE FOR MAKING COMPOUND WIRE.
No. 310,805. Patented Jan. 13, 1885.
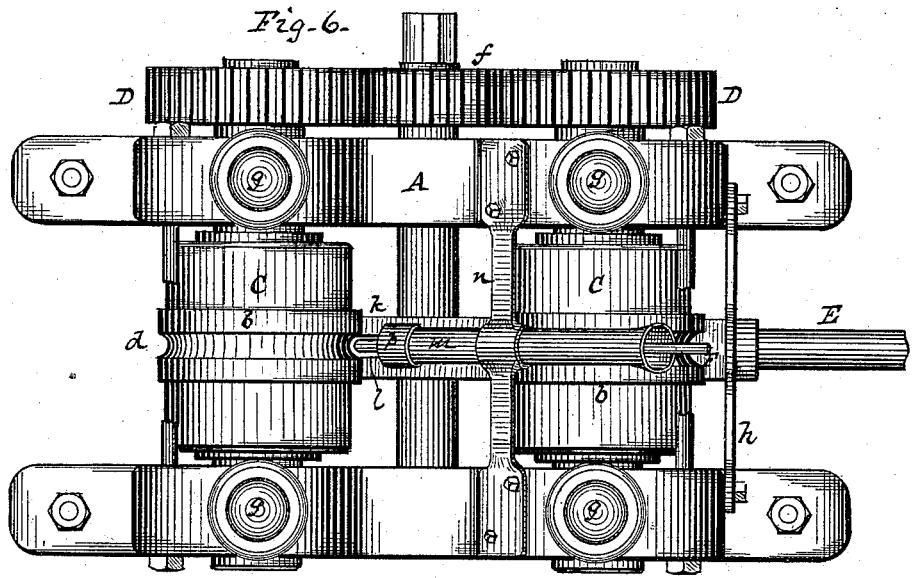
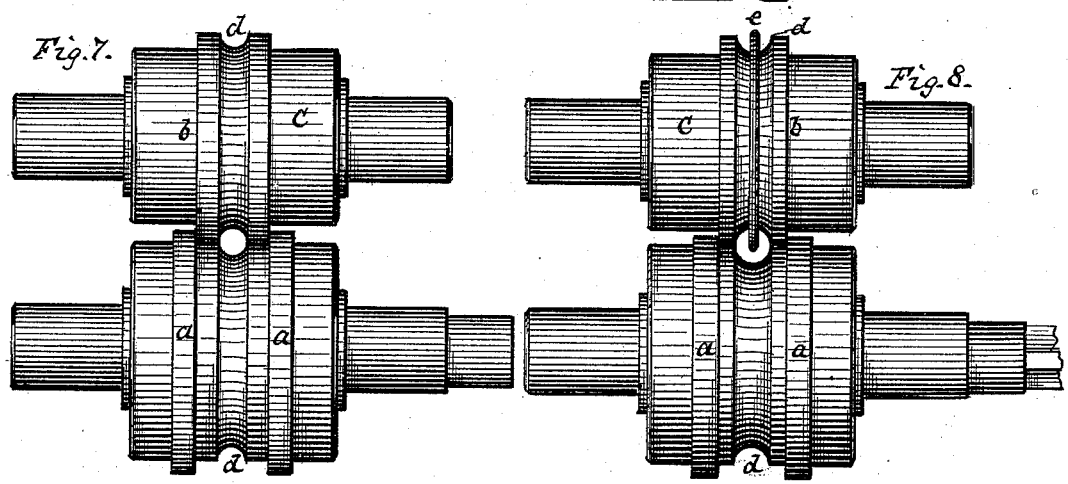
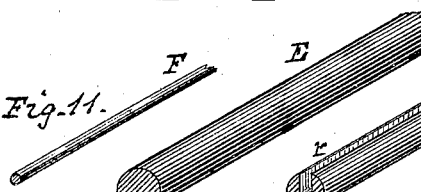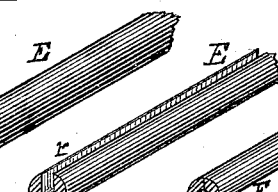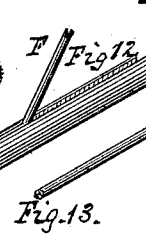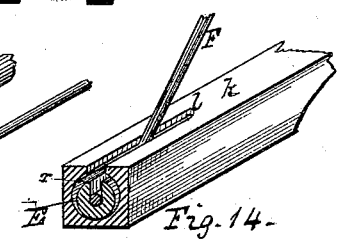
Witnesses:
H. D. Gamble
Jno. M. Macdonald
Inventor.
Josiah W. Ells though not in the same horizontal plane with them, is another strong iron bar or guide, whose upper surface coincides with the horizontal plane of the upper surface of the lowermost receiving-roll.

UNITED STATES PATENT OFFICE.

JOSIAH W. ELLS, OF PITTSBURG, PENNSYLVANIA.

MACHINE FOR MAKING COMPOUND WIRE.

SPECIFICATION forming part of Letters Patent No. 310,805, dated January 13, 1885.

Application filed March 15, 1884. (No model.)

*To all whom it may concern:*

Be it known that I, JOSIAH W. ELLS, a citizen of the United States, residing at Pittsburg, in the county of Allegheny and State of Pennsylvania, have invented new and useful Means for Producing Iron or Steel Wire Provided with or Containing a Copper Core, of which the following is a specification.

The nature of my invention will be readily understood from the following description, taken in connection with the accompanying drawings, wherein—

Figure 1:
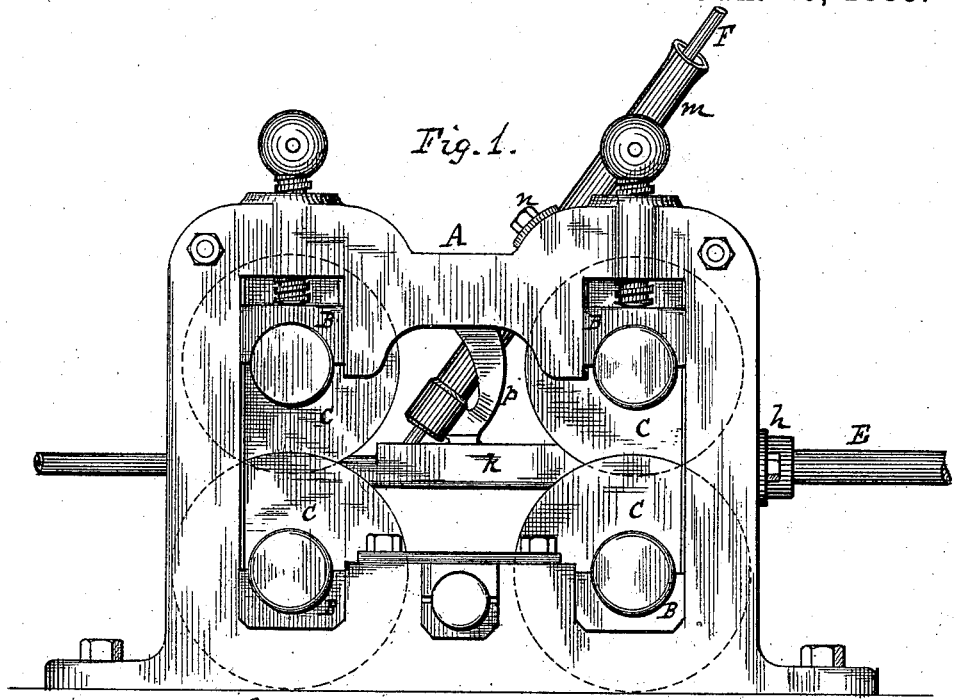
Figure 2:
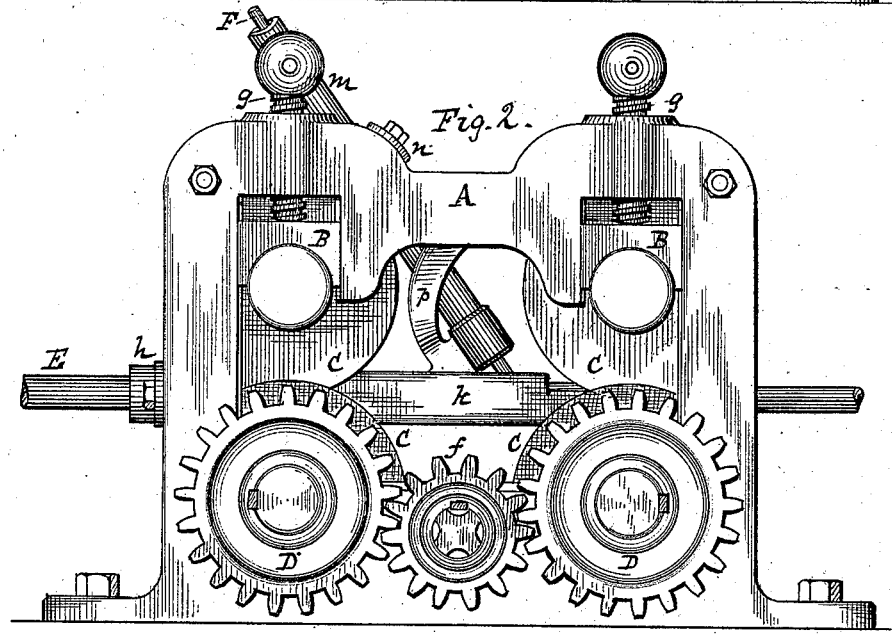

Figure 1 represents in side elevation a machine provided with grooved rolls and suitable guides, together with such other appliances as are necessary and useful in the operation of preparing hot iron bars for the reception of a copper core, including means for closing and welding of the iron around the copper; Fig. 2, the opposite side of said machine, showing the manner of gearing the rolls together; Fig. 3, a longitudinal vertical and central section of said machine; Fig. 4, a front view of the receiving end of the machine; Fig. 5, an elevated view of the discharge end of the machine; Fig. 6, a plan or top view of the entire machine. Fig. 7 represents the rolls used in closing and welding the iron over and around the copper rod; Fig. 8, the rolls for forming a deep longitudinal groove in the iron preparatory to its reception of the copper rod. Fig. 9 represents a solid round iron bar; Fig. 10, the same iron bar, wherein is formed a deep longitudinal channel. Fig. 11 represents a solid copper rod of a size that will snugly and without inconvenience enter the groove in the iron; Fig. 12, the grooved bar of iron, one portion of which has received the copper rod and inclosed the same. Fig. 13 represents the same bar of iron and its copper core reduced to the condition and tenuity of wire; Fig. 14, a detached perspective view of the guide-box arranged between the rolls, and having therein as it passes through it the grooved bar of iron in the act of receiving the copper rod.

To put my invention into practice, and thereby make iron wire provided with or containing an inner part or core of copper, I first prepare and construct for the purpose a requisite machine, consisting of a frame, A, of proper size and sufficiently strong to sustain without vibration the action of the moving parts. In suitable bearings, B, in each end of said frame, arranged one above the other, is a pair of heavy rolls, C, similar to those used in iron-works for the production of round rods. The lower roll of each pair is provided with two collars, *a*, between which a projecting portion, *b*, of the upper roll snugly fits in such a manner as to revolve freely and prevent the rolls from changing or shifting relative positions in the direction of their length. Midway of the collars *a* around each of these rolls is a groove, *d*, of such shape as to form a circular space for the passage of the iron. The grooves in the discharging-rolls are not quite so large as those in the receiving-rolls; consequently the circular space existing between them is proportionably smaller. The uppermost receiving-roll has extending outwardly from the middle depth of its groove a thin projecting tongue or fillet, *e*, so contrived as to form a deep narrow channel or longitudinal furrow in such hot bars of iron as may be passed through the circular space between these rolls. One end of each lower roll is longer than the one above it, and extends outwardly beyond its bearing on that side of the frame A, and both these extending ends are respectively provided with a strong toothed wheel, D, that engages with another toothed wheel or pinion, *f*, so arranged and operating between them as to give each under roll a positive revolving movement in a proper direction upon the application of sufficient moving force. The upper roll of each pair is pressed down on that beneath by means of powerful screws *g*, so that each geared roll drives its fellow roll entirely by friction, a method in practice producing the best results, as then both revolve uniformly with the same rate of speed.

Across the front end of the frame A, and securely bolted thereto, is a strong iron bar, *h*, in or through the middle of which is a hole, *i*, somewhat larger than the circular space between the rolls, with which it coincides, for the purpose of properly directing the iron thereinto.

Extending horizontally between the two lower rolls, and rigidly affixed in that position, is a long hollow guide-box, $k$, its interior being circular in transverse section, or so formed and arranged as to freely receive, accommodate, and allow the passage through it of an iron bar of the shape and condition in which it leaves the first pair of rolls, and is forced along said rolls toward the secondary pair of rolls. This guide-box $k$ may be in one piece; but I prefer to make it of two or more pieces and bolt the same together, as being a better and easier mode of construction. The top exit end of this hollow guide $k$ is slotted or provided with a narrow channel, $l$, extending back some distance from its said end and down into its interior.

Just above and in close proximity to the narrow top slit, $l$, in the guide-box $k$, so as to communicate therewith, and extending upwardly therefrom in a sloping direction or backward incline, is affixed a long tubular chute or open-ended pipe, $m$, held in proper position by means of a transverse bar, $n$, and hanger $p$, attached to the main frame A, whereby it is made adjustable and detachable.

The construction of the machine, together with the relative position and arrangement of its several parts, having been described, its operation and the mode or manner of providing rods of iron with a copper core is as follows: The several rolls of the machine are given a rapidly-revolving movement in a proper direction by means of a steam-engine or other power. I then take a bar of round iron, E, suitable in quality, length, and thickness, and also a rod of copper, F, much smaller in diameter than the iron, but of the same or nearly the same length. This rod of copper F, either hot or cold, is then placed in the inclined tubular chute $m$, so that its lower end shall extend through the slit or narrow opening $l$ in the top of the guide-box $k$ and rest upon its bottom. The bar of iron E is then brought to a welding heat, and in that condition introduced end foremost through the guide-hole $i$, leading to the grooves in the first or adjacent pair of rolls, which immediately seize thereon and by their joint action draw the iron rapidly through between them. The upper roll of this pair, by means of its projecting tongue or fillet, forms a deep narrow channel or longitudinal furrow, $r$, in the iron, and thrusts it forward with considerable force into the die-box $k$ and toward the second pair of rolls; but before reaching them it encounters the lower end of the copper rod F and engages it in such a manner as to draw it down the chute $m$ and deposit the same closely along the bottom of the channel $r$ in the iron bar E as it swiftly slides through the die-box $k$. As the operation of forming a channel in the iron and placing the copper rod therein takes but a moment of time, the iron will, therefore, reach the second pair of rolls while at a good welding heat, whereupon they will seize and draw it through between them, so compressing the iron laterally or sidewise as to effectually and completely close and weld it tightly over and around the copper rod. The iron bar will consequently be reduced or made smaller in transverse section, to an extent, however, not much exceeding that required for a complete closing of the iron above the copper and perfect welding of the same.

In the operation just described the iron will impart to its inclosed copper rod a degree of heat equaling that of itself, and both will be found, when discharged from the machine, to be uniform in that particular, retaining and possessing a sufficiency of heat that will without further delay or reheating enable the compound bar or "billet" to be gradually reduced and elongated by repeated passages between properly-constructed grooved rolls of that character as are ordinarily made use of for the reduction of iron bars to the condition or size known as "wire rod," which, through the common process of annealing, pickling, and otherwise cleaning, can be prepared for further reduction and extension by drawing the same through such dies and in the manner generally adopted by wire-manufacturers, after which said compound wire may be given a coating of zinc or other material, as a means of protection against external oxidation.

This invention enables me to make iron or steel wire of any reasonable length and degree of tenuity containing a copper core located directly and uniformly along its center, and as strong as wire consisting entirely of iron, and of the same tensile resistance, but much superior as a conductor of electricity; and in that respect its use will be especially advantageous for telegraphic, telephonic, and similar lines requiring a wire having strength to sustain itself between widely-separated poles, and in addition a high degree of conductivity, which is a matter of the utmost importance, as thereby messages can be sent greater distances with less battery force, unaffected by induction or outside influences.

Having thus described my invention, I claim—

1. In a machine, and as a means for providing bars or rods of iron with an inner part or core of copper, the combination of a pair of grooved rolls, one of which is formed with a projecting tongue or fillet for making a deep longitudinal channel or furrow in and along one side of the iron, a guide for properly directing the iron to and between the rolls, and a guide on the opposite or discharging side thereof for receiving the channeled iron as it leaves said rolls.

2. In a machine for providing bars or rods of iron with an inner part or core of copper, the combination of a pair of grooved rolls, one of which is constructed with a projecting tongue or fillet for forming a deep longitudinal channel or furrow in and along one side of the iron, a guide for properly directing the iron to and between the rolls, a guide on the opposite or discharge side of the rolls for receiving the channeled iron, and a chute for sustaining and properly delivering a rod of copper into and along said channel in the iron.

3. In a machine for providing bars or rods of iron with an inner part or core of copper, the combination of a pair of rolls for forcing bars or rods of iron through a guide-box, an inclined chute for delivering a rod of copper to the iron, and a pair of rolls for compressing the iron around the copper.

4. In a machine for providing bars or rods of iron with an inner part or core of copper, the combination of a pair of rolls for forcing bars or rods of iron through a guide-box, a chute for delivering a rod of copper to the iron, and a pair of rolls for compressing and welding the iron around the copper, a toothed wheel on one of each pair of rolls, and an intermediate pinion to operate in conjunction therewith.

5. In a machine for providing bars or rods of iron with an inner part or core of copper, the combination of a guide for properly directing a bar or rod of iron to receive a copper rod, a chute for delivering a rod of copper to the iron, and a pair of rolls for compressing the iron over and around the copper.

6. In a machine for providing bars or rods of iron with an inner part or core of copper, the combination of a guide for properly directing a bar or billet of iron to receive a copper rod, and a chute affixed to the machine by means whereby the chute may be adjusted or detached.

JOSIAH W. ELLS.

Witnesses:
H. D. GAMBLE,
JNO. W. MACDONALD.